Patented Nov. 20, 1923.

1,474,933

UNITED STATES PATENT OFFICE.

ROBERT E. HUMPHREYS, FRANCIS M. ROGERS, AND OSCAR E. BRANSKY, OF WHITING, INDIANA, ASSIGNORS TO STANDARD OIL COMPANY (OF INDIANA), OF CHICAGO, ILLINOIS, A CORPORATION OF INDIANA.

WATER-SOLUBLE SULPHONIC ACIDS FROM PETROLEUM OILS AND METHOD OF PRODUCING THE SAME.

No Drawing. Application filed October 25, 1918. Serial No. 259,689.

*To all whom it may concern:*

Be it known that we, ROBERT E. HUMPHREYS, FRANCIS M. ROGERS, and OSCAR E. BRANSKY, citizens of the United States, residing at Whiting, in the county of Lake and State of Indiana, have invented a new and useful Improvement in Water-Soluble Sulphonic Acids from Petroleum Oils and Methods of Producing the Same, of which the following is a specification.

In the treatment of petroleum oils, particularly the heavier fractions thereof, with fuming sulphuric acid to produce the highly refined products marketed as lubricants and as medicines for internal use (liquid paraffine), it has heretofore been known that there is produced a considerable quantity of sulphonic acids soluble in the oil under treatment. These oil soluble acids, which by reason of their color are known to the trade as mahogany acids and will hereinafter be identified by that term, have heretofore been separated from the oil, purified and put to various industrial uses.

We have discovered that there is formed by the treatment of the mineral oils mentioned with large quantities of fuming sulphuric acid not only these heretofore known mahogany acids which are readily soluble in the oil and therefore must be separated from the oil at the conclusion of the treatment thereof, but another distinct acid or group of acids which are more readily soluble in water, and which do not remain in the oil body but separate out in the sludge layer. This new petroleum sulphonic acid, which by reason of its color when produced we identify as green acid, is obtained in the following manner:

The mineral oil under treatment, for example, a lubricating stock from mid-continent crude petroleum, has added thereto successive batches of fuming sulphuric acid, the mixture being agitated after the addition of each batch and then permitted to stratify into an oil layer and a sludge layer, the latter being drawn off before the next succeeding batch of acid is introduced. The first sludge produced by such treatment will usually contain a high percentage of acid coke and is therefore not so readily handled as are the later sludge dumps. The acid may be separated from the sludge in the following manner:

(1) The sludge is first diluted with a medium heavy petroleum distillate, and after agitation and stratification the latter is drawn off, carrying with it a considerable proportion of the oil and oil soluble or mahogany acids which were originally entrained in the sludge. The remaining sludge is now substantially free of the heretofore known mahogany acids.

(2) Water is now added and the diluted sludge is thoroughly boiled and permitted to settle. The gravity of the separated acid layer should not be lower than 15° Baumé, the dilution being properly regulated to accomplish this result. By this treatment the bulk of the sulphuric acid present in the sludge is caused to stratify in the dilute solution at the base of the tank and may be drawn off.

(3) The supernatant sludge layer is now treated with $Na_2CO_3$ in sufficient proportions to neutralize the sulphonic acids as well as any sulphuric acid present, producing sodium sulphonates and sodium sulphate.

(4) The solution obtained by (3) supra is repeatedly extracted with naphtha for the removal of the remaining oil.

(5) The oil-free sodium sulphonates and sodium sulphate are now treated with free sulphuric acid, and upon settling the mixture stratifies into an upper layer of the green sulphonic acid and a lower layer of sulphuric acid in which the green acids are substantially insoluble. The sulphuric acid being drawn off, the new sulphonic acids of our invention remain in a state of purity suitable for the market. As a variant of the above described process a mixture of sodium sulphate, sodium sulphonates and oil produced by step No. 3 supra may be extracted with alcohol (ethyl or methyl), which is a solvent for the sodium sulphonates but will not dissolve either the sodium sulphate or the oil. These sodium sulphonates may be recovered from the alcohol extract by the simple distillation of the solvent.

*Physical and chemical properties of green acids.*

The green acids obtained as in the foregoing are probably mixtures of acids having closely analogous but specifically different physical and chemical properties, it being doubtful whether their composition is constant enough to justify the use of a definite molecular or combining weight. It would appear that a combining weight of 360 is approximately correct for the products heretofore obtained. The acids when free of water are practically solid at ordinary temperatures, and are quite strongly acid, being readily titrated, using methyl orange as an indicator.

*Solubility.*—The green acids are very readily soluble in water, hot or cold, and with difficulty soluble in oil, thereby clearly distinguishing from the mahogany acids which while soluble in water in practically any proportions do not go into solution with the readiness displayed by the green acids, on the other hand, going into solution with great readiness in oil, whereas the green acids as stated cannot be so easily dissolved in oil. These relative oil solubilities are best exemplified by the process of production of the green acids as heretofore described, it being apparent that where a mixture of green and mahogany acids is present in a menstruum consisting of acid and oil the bulk of the mahogany acids remain in solution in the oil, while the bulk of the green acids go into solution in the acid sludge.

The green acids are very readily soluble in chloroform, ethyl, methyl and amyl alcohol and benzene, and somewhat sparingly soluble in carbon-tetrachloride, carbon disulphide, xylene, naphtha and ether. The mahogany acids, on the contrary, are perfectly soluble in ether, and while soluble in chloroform are relatively insoluble in amyl-alcohol. Some lack of homogeneity in the green acids is evidenced by their solubilities, it being possible to fractionate them to some extent by the use of solvents.

From the foregoing it will be understood that we have been able to produce and to separate and identify a heretofore unknown product which may be obtained economically in large quantities, constituting as it does a by-product of the refining of petroleum oil.

What we claim is:

1. A mixture of sulphonic acids from the sludge from fuming acid treatment of petroleum oils which is freely soluble in water in the presence of oil, only partially soluble in ether and freely soluble in amyl alcohol and has a combining weight of approximately 360.

2. The method of preparing sulphonic acids, which consists in treating petroleum oil with strong sulphuric acid, drawing off the resultant acid sludge, washing the sludge with hydrocarbon oil, diluting the same with water, heating, settling and drawing off the sulphuric acid layer, thereby separating out the sulphonic acids, and purifying the latter.

3. The method of preparing sulphonic acids, which consists in treating petroleum oil with strong sulphuric acid, drawing off the resultant acid sludge, washing the sludge with a medium heavy petroleum distillate, diluting the same with water, boiling, settling and drawing off the sulphuric acid layer, thereby separating out the sulphonic acids, neutralizing the latter and extracting the oil from the neutralized acid.

4. The method of preparing sulphonic acids, which consists in treating petroleum oil with strong sulphuric acid, drawing off the resultant acid sludge, washing the acid sludge with medium heavy paraffin distillate, diluting the acid sludge with water sufficient to produce a sulphuric acid layer having a specific gravity not less than 15° Baumé, boiling, settling, and drawing off the dilute sulphuric acid layer, thereby separating out the sulphonic acids, and neutralizing and extracting the oil from the separated sulphonic acids.

5. In the method of preparing sulphonic acids, the steps which consist in treating petroleum oil with strong sulphuric acid, drawing off the resultant acid sludge, washing the acid sludge with hydrocarbon oil, diluting the acid sludge with water and boiling, settling, and drawing off the dilute sulphuric acid layer, thereby separating out sulphonic acids.

ROBERT E. HUMPHREYS.
FRANCIS M. ROGERS.
OSCAR E. BRANSKY.